United States Patent
Gerakoulis

(10) Patent No.: US 9,100,260 B2
(45) Date of Patent: *Aug. 4, 2015

(54) INTERFERENCE SUPPRESSING OFDM SYSTEM FOR WIRELESS COMMUNICATIONS

(71) Applicant: AT&T Intellectual Property II, L.P., Atlanta, GA (US)

(72) Inventor: Diakoumis Gerakoulis, Dover, NJ (US)

(73) Assignee: AT&T Intellectual Property II, L.P., Atlanta, GA (US)

(*) Notice: Subject to any disclaimer, the term of this patent is extended or adjusted under 35 U.S.C. 154(b) by 53 days.

This patent is subject to a terminal disclaimer.

(21) Appl. No.: 14/248,291

(22) Filed: Apr. 8, 2014

(65) Prior Publication Data

US 2014/0219322 A1  Aug. 7, 2014

Related U.S. Application Data

(63) Continuation of application No. 13/711,336, filed on Dec. 11, 2012, now Pat. No. 8,711,674, which is a continuation of application No. 13/102,887, filed on May 6, 2011, now Pat. No. 8,358,574, which is a continuation of application No. 12/631,758, filed on Dec. 4, 2009, now Pat. No. 7,940,639, which is a continuation of application No. 11/648,081, filed on Dec. 29, 2006, now Pat. No. 7,630,290, which is a continuation of application No. 09/969,795, filed on Oct. 4, 2001, now Pat. No. 7,158,474.

(60) Provisional application No. 60/269,860, filed on Feb. 21, 2001.

(51) Int. Cl.
*H04J 11/00* (2006.01)
*H04L 27/26* (2006.01)
*H04B 1/10* (2006.01)
*H04B 1/71* (2011.01)
*H04L 5/00* (2006.01)

(52) U.S. Cl.
CPC .............. *H04L 27/265* (2013.01); *H04B 1/109* (2013.01); *H04B 1/71* (2013.01); *H04B 1/7102* (2013.01); *H04L 5/0016* (2013.01); *H04L 27/2607* (2013.01); *H04L 27/2627* (2013.01); *H04L 27/2657* (2013.01); *H04L 27/2662* (2013.01); *H04B 2201/7097* (2013.01); *H04B 2201/70727* (2013.01); *H04L 27/2634* (2013.01)

(58) Field of Classification Search
CPC ........................... H04L 5/0007; H04L 27/265
USPC .................. 370/206, 208, 210, 342; 375/260; 714/800
See application file for complete search history.

(56) References Cited

U.S. PATENT DOCUMENTS 4,054,909 A  10/1977  Kojima et al.
5,063,571 A  11/1991  Vancraeynest (Continued)

OTHER PUBLICATIONS

C. Y. Wong, R.S. Cheng, K.B. Letaief and R.D. Murch, "Multiuser OFDM with Adaptive Subcarrier, Bit and Power Allocation", IEEE Journal Selected Areas in Comm., vol. 17, No. 10, Oct. 1999, pp. 1747-1758.

(Continued)

*Primary Examiner* — Brian D Nguyen
*Assistant Examiner* — Toan Nguyen

(57) ABSTRACT

An IS-OFDM system for point-to-point wireless communications that suppresses narrow-band interference comprises an IS-OFDM transmitter and an IS-OFDM receiver, wherein a transmitted signal comprises a plurality of subcarriers, and further wherein each subcarrier contains more than one and potentially all symbols transmitted in a given frame. The IS-OFDM transmitted signal is at a data rate that is equal to the data rate of the input data stream via the use of P/S converters.

14 Claims, 10 Drawing Sheets

(56) References Cited

U.S. PATENT DOCUMENTS

| | | | |
|---|---|---|---|
| 5,425,050 A | | 6/1995 | Schreiber et al. |
| 5,471,464 A | * | 11/1995 | Ikeda .......................... 370/203 |
| 5,548,615 A | | 8/1996 | Wei |
| 5,825,807 A | | 10/1998 | Kumar |
| 5,912,876 A | | 6/1999 | H'mimy |
| 6,088,398 A | | 7/2000 | Wahlqvist et al. |
| 6,134,261 A | | 10/2000 | Ryan |
| 6,282,185 B1 | * | 8/2001 | Hakkinen et al. ............. 370/342 |
| 6,289,009 B1 | * | 9/2001 | Sato .............................. 370/342 |
| 6,369,758 B1 | | 4/2002 | Zhang |
| 6,385,187 B1 | | 5/2002 | Ahn et al. |
| 6,487,258 B1 | | 11/2002 | Jedwab et al. |
| 6,614,861 B1 | | 9/2003 | Terry et al. |
| 6,654,431 B1 | | 11/2003 | Barton et al. |
| 6,668,352 B1 | * | 12/2003 | Jung ............................. 714/800 |
| 6,795,424 B1 | | 9/2004 | Kapoor et al. |
| 6,810,030 B1 | | 10/2004 | Kuo |
| 6,826,239 B1 | | 11/2004 | Usui |
| 6,882,619 B1 | | 4/2005 | Gerakoulis |
| 6,934,317 B1 | | 8/2005 | Dent |
| 7,133,355 B1 | | 11/2006 | Gerakoulis |
| 7,158,474 B1 | | 1/2007 | Gerakoulis |
| 7,324,437 B1 | | 1/2008 | Czylwik et al. |
| 7,630,290 B1 | | 12/2009 | Gerakoulis |
| 7,738,358 B1 | | 6/2010 | Gerakoulis |
| 7,940,639 B2 | | 5/2011 | Gerakoulis |
| 2002/0122499 A1 | * | 9/2002 | Kannan et al. ................ 375/260 |
| 2002/0191676 A1 | | 12/2002 | Kenneth |
| 2004/0190598 A1 | | 9/2004 | Seki et al. |
| 2004/0228272 A1 | | 11/2004 | Hasegawa et al. |

OTHER PUBLICATIONS

H-J Su and E. Geraniotis, "A Distributed Power Allocation Algorithm with Adaptive Modulation for Multi-Cell OFDM System", in Proceeding of ISSSTA '98, pp. 474-478.

C. Carlemalm, H. V. Poor and A. Logothetis, "Suppression of Multiple Narrowband Interferers in Spread-Spectrum Communication System", IEEE Journal Selected Areas in Comm., vol. 18, No. 8, Aug. 2000, pp. 1365-1374.

N. Yee, J-P.M.G. Linnartz and G. Fettweis, "Multi-Carrier CDMA in Indoor Wireless Radio Networks", IEICE Trans. Comm., vol. E77-B, Jul. 1994, pp. 900-904.

Li Ping, "A Combined OFDM-CsDMA Approach to Cellular Mobile Communications", IEEE Trans., on Comm., vol. 47, No. 7, Jul. 1999, pp. 979-982.

X. Gui and T.S. Ng., "Performance of Asynchronous Orthogonal Multicarrier CDMA System in Frequency Selective Fading Channel", IEEE Trans. On Comm., vol. 47, No. 7, Jul. 1999, pp. 1084-1091.

L. Vandendorpe, "Multitone Spread-Spectrum Multiple Access Communications System in Multipath Rician Fading Channel", IEEE Trans. on Vehicle. Tech., vol. 44, No. 2, May 1995, pp. 327-337.

H. Steendam and M. Moeneclaey, "Analysis and Optimization of the Performance of OFDM on Frequencey-Selective Time-Selective Fading Channels", IEEE Trans. On Comm., vol. 47, No. 12, Dec. 1999, pp. 1811-1819.

M. Speth, S.A. Fechtel, G. Fock and H. Meyr, "Optimum Receiver Design for Wireless Broad-Band System Using OFDM-Part I", IEEE Trans. on Comm., vol. 47, No. 11, Nov. 1999, pp. 1668-1677.

Y. Li and L.J. Cimini, "Bounds on the Interchannel Interference of OFDM in Time-Varying Impairments", IEEE Trans. on Comm., vol. 49, No. 3, Mar. 2001, pp. 401-404.

M. Luise and R. Reggiannini, "Carrier Frequency Acquisition and Tracking for OFDM Systems," IEEE Trans. on Comm., vol. 44, No. 11, Nov. 1996, pp. 1590-1598.

U. Lambrette, M. Speth and H. Meyr, "OFDM Burst Frequency Synchronization by Single Carrier Training Data," IEEE Comm. Letters, vol. 1, No. 2, Mar. 1997, pp. 46-48.

W. R. Braun, "PN Acquisition and Tracking in DS/CDMA Systems with Symbol-Length Spreading Sequences", IEEE Trans. on Comm., vol. 45, No. 12, Dec. 1997, pp. 1595-1601.

PTO-892 attached to Office Action dated Feb. 2, 2006, of U.S. Appl. No. 11/103,762, filed Apr. 12, 2005.

* cited by examiner

INTERFERENCE SUPPRESSING OFDM SYSTEM FOR WIRELESS COMMUNICATIONS

This application is a continuation of U.S. patent application Ser. No. 13/711,336, filed Dec. 11, 2012, which is currently allowed and is a continuation of U.S. patent application Ser. No. 13/102,887, filed May 6, 2011, now U.S. Pat. No. 8,358,574, and is a continuation of U.S. patent application Ser. No. 12/631,758, filed Dec. 4, 2009, now U.S. Pat. No. 7,940,639, which is a continuation of U.S. patent application Ser. No. 11/648,081, filed Dec. 29, 2006, now U.S. Pat. No. 7,630,290, which is a continuation of U.S. patent application Ser. No. 09/969,795, filed Oct. 4, 2001, now U.S. Pat. No. 7,158,474; which claims priority under 35 USC §119(e) to U.S. provisional patent application Ser. No. 60/269,860, filed on Feb. 21, 2001, all of which are herein incorporated by reference in their entirety.

FIELD OF INVENTION

The present invention relates to an Orthogonal Frequency Division Multiplexed (OFDM) system and method that has the capabilities of suppressing narrow-band interference and combating channel impairment in wireless applications requiring high data rates. The Interference Suppression OFDM (IS-OFDM) system and method of the present invention provides point-to-point wireless links without spreading the incoming data rate.

BACKGROUND OF THE INVENTION

Orthogonal Frequency Division Multiplexing (OFDM) has been accepted as a mature technology for wireless broadband communication links. Its design as a multi-carrier system, allows the support of high data rates while maintaining symbol durations longer than the channel's dispersion time. Thus, OFDM modems can have reliable high data rate transmission in time-dispersive or frequency-selective channels without the need for complex time-domain channel equalizers. OFDM can also provide high spectral efficiency by taking advantage of the adaptive nature of the multi-carrier modulation. Information feedback of the channel conditions is used for allocating and adapting the modulation load for each sub-carrier in order to maximize the channel throughput. Such a prior art concept, is effective when channel conditions vary slowly. Another prior art approach, provides suppression of narrow-band interferers by using a hidden Markov model filter for detecting and estimating interference in the frequency domain.

Related prior art methods, used in multi-user communication, are known as multi-user OFDM, multi-carrier or multi-tone CDMA. These methods are the results of combining the OFDM with CDMA. The CDMA (binary) spreading sequences are used for distinguishing and separating the user transmissions while OFDM is used to enhance the link performance of each transmission in the presence of interference (from the other users) and channel impairments. A multi-user OFDM or multi-carrier CDMA system may be a synchronous one if its transmission is in the downlink (point-to-multi-point) or an asynchronous one if its transmission is in the uplink. Also, a multi-user OFDM or multi-carrier CDMA system may either be a bandwidth expanding (spreading the spectrum) one or a non-bandwidth expanding (not spectrum-spreading) one. The non-bandwidth expanding multi-carrier CDMA systems are based on the method of orthogonal code division multiplexing (OCDM), or multi-code CDMA (MC-CDMA) in which a serial-to-parallel converter is used to provide parallel outputs that are "spread" to the original input rate by means of orthogonal sequences.

SUMMARY OF THE INVENTION

The present invention proposes an alternative improved method, which makes the OFDM system resistant to narrow-band interference and channel impairments. In the proposed method the power of any transmitted symbol is distributed in more than one and possibly in all sub-carrier channels. Hence, each sub-carrier "contains" more than one or all symbols transmitted in a given frame. The different symbols in the same sub-carrier are separated and distinguished by orthogonal sequences. This is equivalent to having several OFDM systems combined in parallel with the same frequency sub-carriers in which each parallel OFDM encodes the same symbol in more than one (and possibly in all) of its frequency sub-carrier channels (frequency bins). Then, the parallel OFDM systems are orthogonally separated with Hadamard sequences so that the OFDM systems do not interfere with each other. Therefore, more than one, or possibly all, frequency bins contain the same information. This provides redundancy in the case where one or more sub-carriers are affected by narrow-band interferers or frequency-selective fading. For this reason the proposed OFDM system is called interference suppressing OFDM (IS-OFDM). The present invention has all of the advantages of the known OFDM system and method (which is a special case of IS-OFDM) and, additionally, offers frequency diversity, which is the result of distributing the transmit power of each symbol into more than one frequency bin. The IS-OFDM system and method of the present invention also allows the implementation of a multi-path resolution mechanism aided by the use of its orthogonal Hadamard sequences.

The IS-OFMA presented here is a point-to-point transmission method (not a multi-user one), which also does not spread its transmission bandwidth. The IS-OFDM may also be viewed as an orthogonal code division multiplexing (OCDM) system in which symbols are spread in parallel by orthogonal complex sequences. This type of IS-OFDM mathematical model is presented below.

It is, therefore, an object of the present invention to provide a point-to-point wireless link without spreading the incoming data rate.

It is yet another object of the present invention to maintain symbol duration longer than the channel's dispersion time.

It is a further object of the present invention to provide narrow-band interference suppression.

It is yet another object of the present invention to maintain the orthogonality between Hadamard sequences in a channel that is frequency-selective and thus to average the power of each transmitted symbol over all frequency bins.

It is a further object of the present invention to permit the resolution of multi-paths.

BRIEF DESCRIPTION OF THE DRAWINGS

The invention is best described with reference to the detailed description and the following figures, where.

DETAILED DESCRIPTION OF THE PREFERRED EMBODIMENTS

Figure 1:
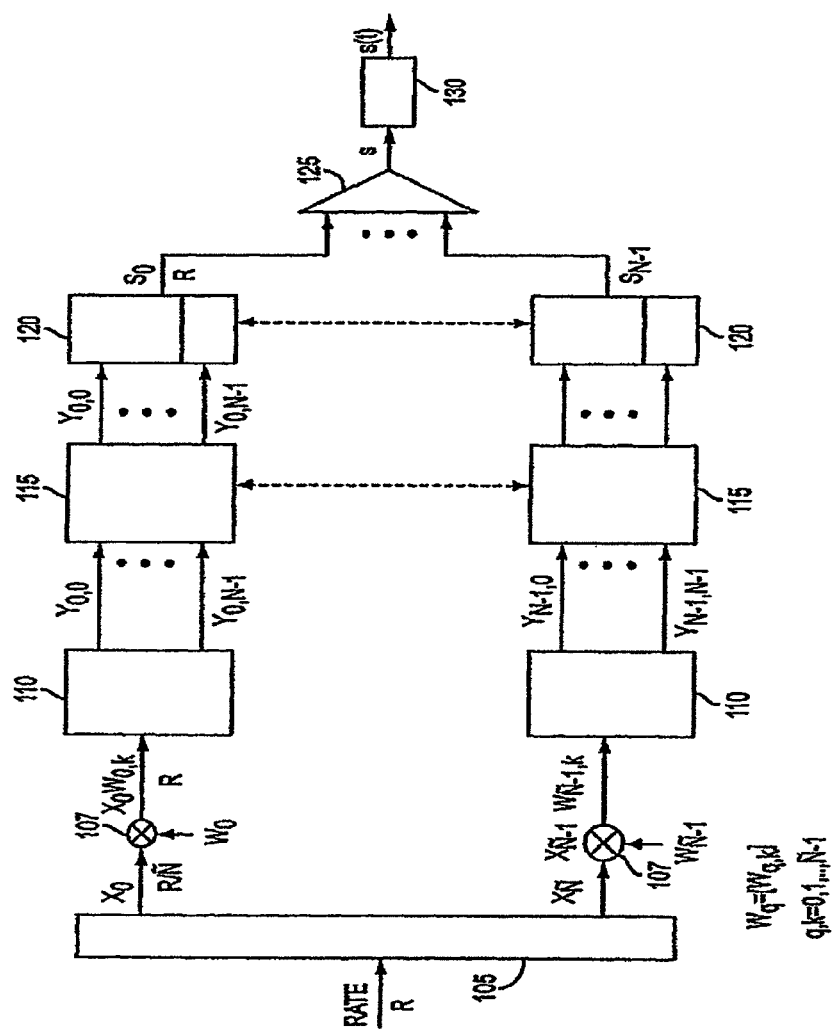
FIG. 1 is a functional block schematic diagram of an IS-OFDM transmitter.

The IS-OFDM transmitter is illustrated in FIG. 1. The input data stream of rate R bits/sec, enters a serial-to-parallel (S/P) converter 105, which provides $\tilde{N}$ parallel data streams each with rate $R/\tilde{N}$ bits/sec. At the output of the S/P converter, a data signal $x_q$ (T sec long), of a parallel stream q is spread (by spreader 107) by an orthogonal binary Hadamard code sequence $w_q=[w_{q,0}, W_{q,2}, \ldots, w_{q,\tilde{N}-1}]$ for $q=0, \ldots, \tilde{N}-1$. After the spreading operation the signal rate is again R bits/sec. Assuming that $x_q$ represents a complex-valued signaling point in a QAM constellation, i.e., $x_q=\alpha_q+j\beta_q$, the spread signal then is $$X_{q,k}=x_q w_{q,k}=\alpha_q w_{q,k}+j\beta_q w_{q,k} \text{ for } k=0,\ldots,\tilde{N}-1 \quad (1)$$

The above process is called orthogonal code division multiplexing (OCDM) and provides a set of $\tilde{N}$ parallel data streams, which are separated from each other by orthogonal codes.

In the next step, each of the parallel orthogonal streams is processed as in an ordinary OFDM. That is, each of the spread signals enters a S/P bit-buffer and encoder device 110, which provides N parallel sub-streams. The encoder creates $N=2\tilde{N}$ complex data points defined by, $$Y_{qk} = \begin{cases} \alpha_q w_{q,0} & \text{for } k = 0 \\ X_{q,k} & \text{for } k = 1, 2, \ldots, \tilde{N}-1 \\ \beta_q w_{q,0} & \text{for } k = \tilde{N} \\ X_{q,N-k}^* & \text{for } k = \tilde{N}+1, \ldots, N-1 \end{cases} \quad (2)$$

where (*) denotes complex conjugate and both $Y_{q,0}$ and $Y_{q,\tilde{N}}$ are real valued. The N parallel data streams are then input to an inverse discrete Fourier Transform 115. Given the above symmetry condition the output of the inverse discrete Fourier Transform (idft or ifft) that follows is real-valued. The resulting idft or ifft output samples then are, $$y_{gm} = \frac{1}{\sqrt{N}} \sum_{k=0}^{N-1} Y_{q,k} e^{j2\pi(km/N)} \text{ for } m = 0, 1, \ldots, N-1 \quad (3)$$

The N parallel idft or ifft outputs each then enter a parallel-to-serial (P/S) converter 120, which also adds a guard-time or cyclic prefix to each frame. The output P/S signal of the parallel stream-q then is given by, $$s_q(m) = \frac{1}{\sqrt{N_s}} \sum_{k=0}^{N-1} Y_{q,k} e^{j2\pi(km/N)} \text{ for } m = 0, 1, \ldots, N-1 \quad (4)$$

where $N_s=N+N_g$ and $N_g$ is the number of guard-samples added to the frame.

The IS-OFDM process described above takes place in parallel for each q, ($q=0, 1, \ldots, \tilde{N}-1$) and all $\tilde{N}$ parallel IS-OFDM data signals are synchronized to each other in both frequency (rate) and timing (delay). That is, the $\tilde{N}$ parallel IS-OFDM data signals have exactly the same frequency bins and their time-frames are in synch. The parallel IS-OFDM data signals $s_q(m)$ are then summed-up by an accumulator 125 to provide the IS-OFDM signal $s(m)=\Sigma_{q=0}^{\tilde{N}} s_q(m)$ which enters the digital-to-analog (D/A) converter 130 to provide the transmit signal s(t).

Figure 2:
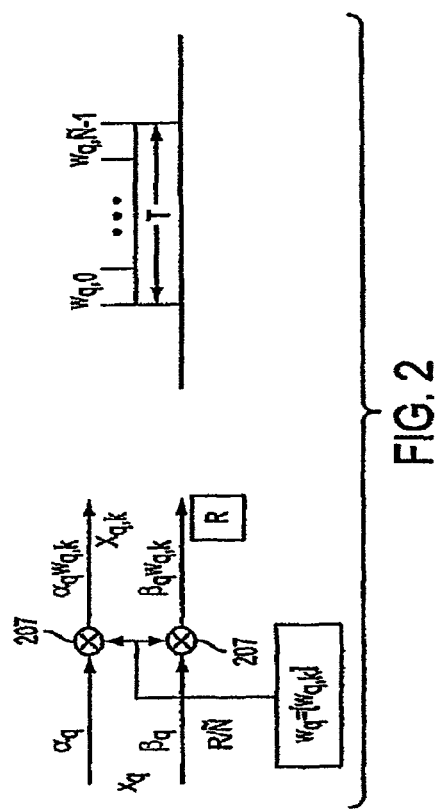
FIG. 2 depicts the IS-OFDM spreading operation.
Figure 3:
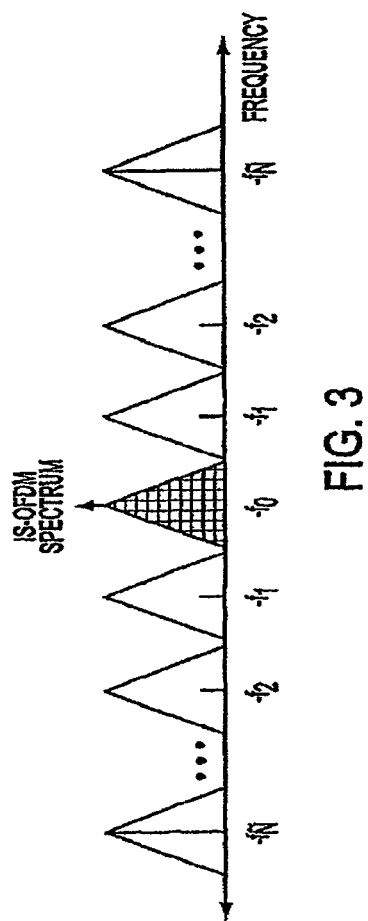
FIG. 3 shows the IS-OFDM frequency spectrum.

Details of the spreading process are illustrated in FIGS. 2a and 2b. Complex signaling point $x_q=\alpha_q+j\beta_q$ has real component $\alpha_q$ and complex component $\beta_q$. Both components are spread by the Hadamard code $w_q$, which is a vector of $[w_{q,k}]$. The components are spread by spreaders 207. As shown in FIG. 2b, the entire sequence of length T has to "overlay" a single data symbol also of length T. The arrangement of sub-carrier frequencies is illustrated in FIG. 3.

Figure 4:
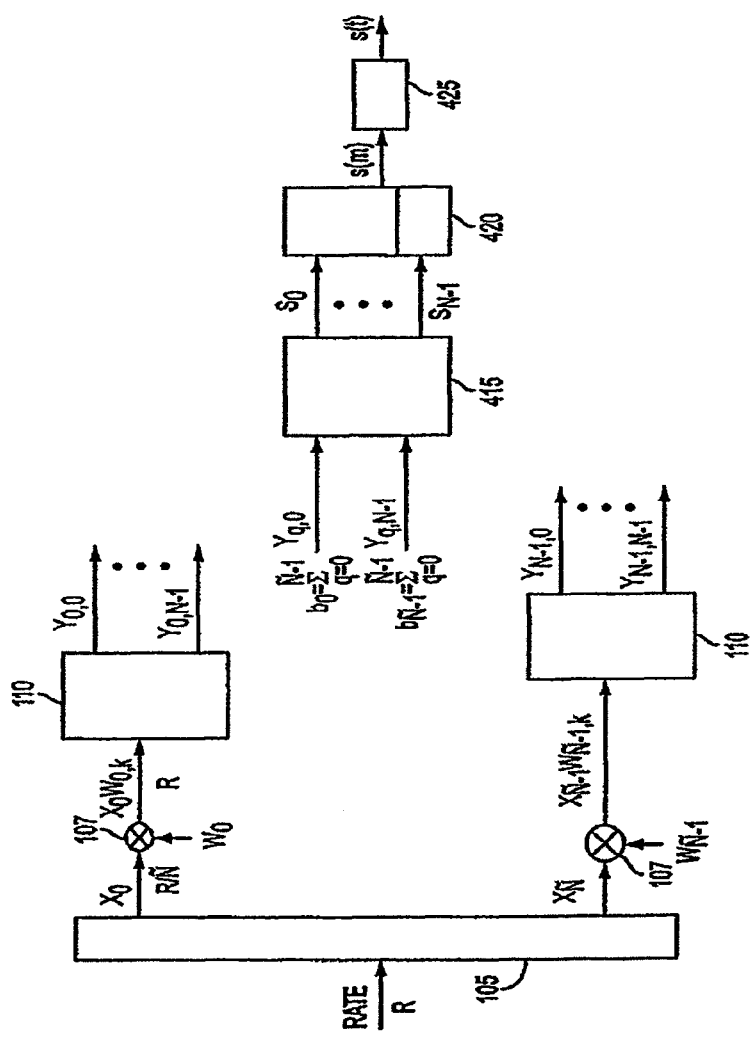
FIG. 4 is an alternative embodiment of the IS-OFDM transmitter.

Now, using the assumption that the $\tilde{N}$ parallel processes of idft or ifft and P/S are synchronized, an equivalent arrangement of the above IS-OFDM transmitter may be drawn. The input data stream of rate R bits/sec, enters a serial-to-parallel (S/P) converter 105, which provides $\tilde{N}$ parallel data streams each with rate Rig bits/sec. At the output of the S/P converter, a data signal $x_q$ (T sec long), of a parallel stream q is spread by an orthogonal binary Hadamard sequence $w_q=[w_{q,0}, w_{q,2}, \ldots, w_{q,\tilde{N}-1}]$ for $q=0, \ldots, \tilde{N}-1$. After the spreading operation the signal rate is again R bits/sec. If the outputs of the $\tilde{N}$ parallel S/P bit-buffers/encoders 110 are taken and summed to provide $\tilde{N}$ parallel data points $b_k$ shown in FIG. 4. The parallel points $b_k$ are given by, $$b_k = \sum_{q=0}^{\tilde{N}-1} Y_{q,k} = \begin{cases} \sum_{q=0}^{\tilde{N}-1} \alpha_q w_{q,0} & \text{for } k = 0 \\ \sum_{q=0}^{\tilde{N}-1} x_q w_{q,k} & \text{for } k = 1, 2, \ldots, \tilde{N}-1 \\ \sum_{q=0}^{\tilde{N}-1} \beta_q w_{q,o} & \text{for } k = \tilde{N} \\ \sum_{q=0}^{\tilde{N}-1} x_q^* w_{q,N-k} & \text{for } k = \tilde{N}+1, \ldots, N-1 \end{cases} \quad (5)$$

Then, the N parallel points bk enter a single idft or ifft 415 followed by a P/S converter 420 (which adds guard-time or cyclic prefix to each frame) the output of which is given by, $$s(m) = \frac{1}{\sqrt{N_s}} \sum_{k=0}^{N-1} b_k e^{j2\pi(km/N)} = \quad (6)$$

$$\frac{1}{\sqrt{N_s}} \sum_{k=0}^{N-1} b_k e^{j2\pi(km/N)} = \frac{1}{\sqrt{N_s}} \sum_{k=0}^{N-1} \sum_{q=0}^{\tilde{N}-1} Y_{q,k} e^{j2\pi(km/N)}$$

It is easily verified that $s(m)=\sum_{q=1}^{N} s_q(m)$ where s (m) is the same as in equation (4). The signal s(m) is then input to an D/A converter 425.

Based on the above description, the Ñ incoming data symbols $[x_0, x_2, \ldots, x_{Ñ-1}]$, to the input of the IS-OFDM transmitter for the period of a frame (Ñ=RT), can be arranged as illustrated by the matrix $D_Ñ$ below.

$$D_Ñ = \begin{bmatrix} x_0 & x_0 & \cdots & x_0 \\ x_1 & x_1 & \cdots & x_1 \\ \cdots & \cdots & \cdots & \cdots \\ x_{Ñ-1} & x_{Ñ-1} & \cdots & x_{Ñ-1} \end{bmatrix} \begin{matrix} \leftarrow w_0 \\ \leftarrow w_1 \\ \\ \leftarrow w_{Ñ-1} \end{matrix}$$
$$\begin{matrix} \uparrow & \uparrow & & \uparrow \\ f_0 & f_1 & & f_{Ñ-1} \end{matrix}$$

Every OFDM frequency bin or sub-carrier $f_i$, i=0, ..., Ñ-1, "contains" all data bits $x_0, x_1, \ldots, x_{Ñ-1}$, which are distinguished from each other by the orthogonal Hadamard sequences $w_q=[w_{q,0}, w_{q,2}, \ldots, w_{q, Ñ-1}]$, k=0, Ñ-1. This means that the power of each data bit is distributed or "spread" to all sub-carriers as opposed to the ordinary OFDM in which a symbol belongs to only one sub-carrier.

Now consider the special case where the orthogonal sequences are not Hadamard but having a (0,1) as, $w_q=[w_{q,k}]$ where, $$w_{q,k} = \begin{cases} 1 & \text{for } q = k \\ 0 & \text{for } q \neq k. \end{cases}$$

Then, it is easily verified that the IS-OFDM becomes the ordinary OFDM. Hence, the ordinary OFDM is a special case of the IS-OFDM, corresponding to the matrix $D_Ñ$ shown below, $$D_Ñ = \begin{bmatrix} x_0 & 0 & \cdots & 0 \\ 0 & x_1 & \cdots & 0 \\ \cdots & \cdots & \cdots & \cdots \\ 0 & 0 & \cdots & x_{Ñ-1} \end{bmatrix} \begin{matrix} \leftarrow w_0 \\ \leftarrow w_1 \\ \\ \leftarrow w_{Ñ-1} \end{matrix}$$
$$\begin{matrix} \uparrow & \uparrow & & \uparrow \\ f_0 & f_1 & & f_{Ñ-1} \end{matrix}$$

Figure 5:
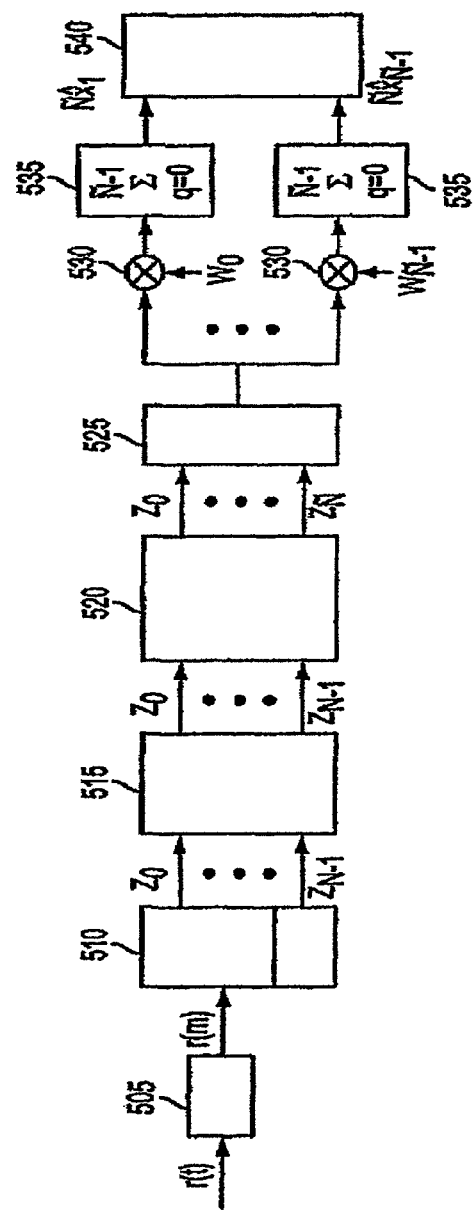
FIG. 5 is a functional block schematic diagram of an IS-OFDM receiver.

The IS-OFDM receiver is illustrated in FIG. 5. As shown, after demodulation and A/D conversion (by A/D converter 505) the received signal r(m) enters a S/P converter 510, which provides N parallel data points $z_m$ for m=0, 1, ..., N-1. The parallel data $z_m$ then enter a discrete Fourier transform (DFT or FFT) 515, which provides N complex data signal points given by, $$Z'_k = \frac{1}{\sqrt{N}} \sum_{m=0}^{N-1} x_m e^{-j2\pi(km/N)} \text{ for } k = 0, 1, \ldots, N-1 \tag{7}$$

The above complex data signal points then enter a decoder-demapper 520, which creates Ñ=N/2 parallel data points defined by, $$Z_k = \begin{cases} Z'_k & \text{for } k = 1, 2, \ldots, Ñ-1 \\ \text{Re}\{Z'_0\} + j\text{Im}\{Z'_Ñ\} & \text{for } k = 0 \end{cases} \tag{8}$$

The process up to this point can be the same as in a known OFDM system. Now, Ñ parallel $Z_k$ points enter a P/S converter 525, the output (serial data stream) of which is despread (by despreaders 530) by the Ñ Hadamard code sequences $w_q=[w_{q,0}, w_{q,2}, \ldots, w_{q, Ñ-1}]$, in parallel for q=0, 1, ..., Ñ-1. The despread data signals are then summed by accumulators 535, as shown in FIG. 5, for producing accumulated data streams, which are then parallel-to-serial (P/S) converted by P/S converter 540 to produce a recovered data stream.

In order to verify the functional correctness of the IS-OFDM system, assuming that the received signal at the output of the A/D converter is the same as the transmitted signal, i.e., r(m)=s(m). The signal at the output of the DFT or FFT then is, $$b_k = \frac{1}{\sqrt{N}} \sum_{m=0}^{N-1} s_m e^{-j2\pi(km/N)} \text{ for } k = 0, 1, \ldots, N-1 \tag{9}$$

where, $s_m$ are the signal points at the output of the S/P converter and after the removal of the cyclic prefix. The signal points at the output of the decoder-demapper then is $$a_k = \sum_{q=0}^{Ñ-1} x_q w_{q,k} \text{ for } k = 0, 1, \ldots, Ñ-1 \tag{10}$$

After the P/S converter the signal at the output of the despreader-1 given by, $$\sum_{k=0}^{Ñ-1} a_k w_{1,k} = \tag{11}$$

$$\sum_{k=0}^{Ñ-1} \left[ \sum_{q=0}^{Ñ-1} x_q w_{q,k} \right] w_{1,k} = \sum_{q=0}^{Ñ-1} x_q \sum_{k=0}^{Ñ-1} w_{q,k} w_{1,k} = \begin{cases} Ñ x_1 & \text{for } q = 1 \\ 0 & \text{for } q \neq 1 \end{cases}$$

The above equation indicates that the signal power at the output of the accumulator–1 is the total power of the signal $x_1$ in all sub-carriers.

Figure 6:
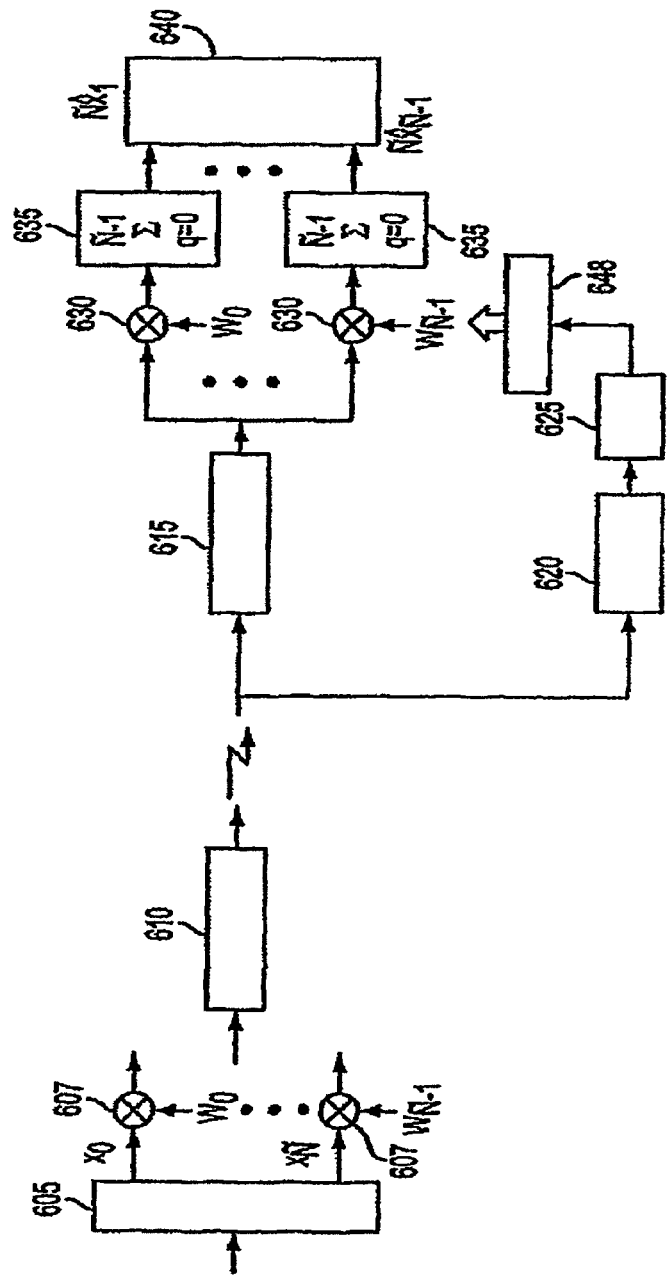
FIG. 6 illustrates the IS-OFDM synchronization process.

The synchronization of the IS-OFDM system consists of the frequency and the time synchronization processes. As shown in FIG. 6, frequency synchronization is obtained by extracting the information needed from the received analog signal either with explicit training data or from the structure of the IS-OFDM signal. Specifically, S/P converter 605, spreaders 607 and the balance of the OFDM transmitter 610 are coupled to form the OFDM transmission subsystem. A portion of the OFDM receiver 615 and despreaders 630 along with accumulators 635 and P/S converter 640 form the OFDM receiver subsystem. The synchronization subsystem forms a portion of the OFDM receiver subsystem and comprises frequency synchronization unit 620, code synchronization unit 625 and code generators 648. Frequency synchronization unit 620 retrieves information needed to perform frequency synchronization from the portion of the OFDM subsystem 615. Frequency synchronization unit 620 is coupled to code synchronization unit 625, which is, in turn, coupled to code generators 648 that are coupled to and provide input to despreaders 630. Code generators generate the orthogonal Hadamard code sequences locally at the receiver. These orthogonal Hadamard code sequences have to be synchronized to the received analog signal in order to despread them. Such techniques, developed for ordinary OFDM systems may also be used here. After the frequency acquisition is accomplished, the orthogonal code sequences are used to provide timing synchronization. Standard CDMA code acquisition and tracking methods can be applied for this purpose. Given that the code sequence length is equal to the symbol length such a process can provide accurate symbol-level time-synchronization continuously.

Figure 7:
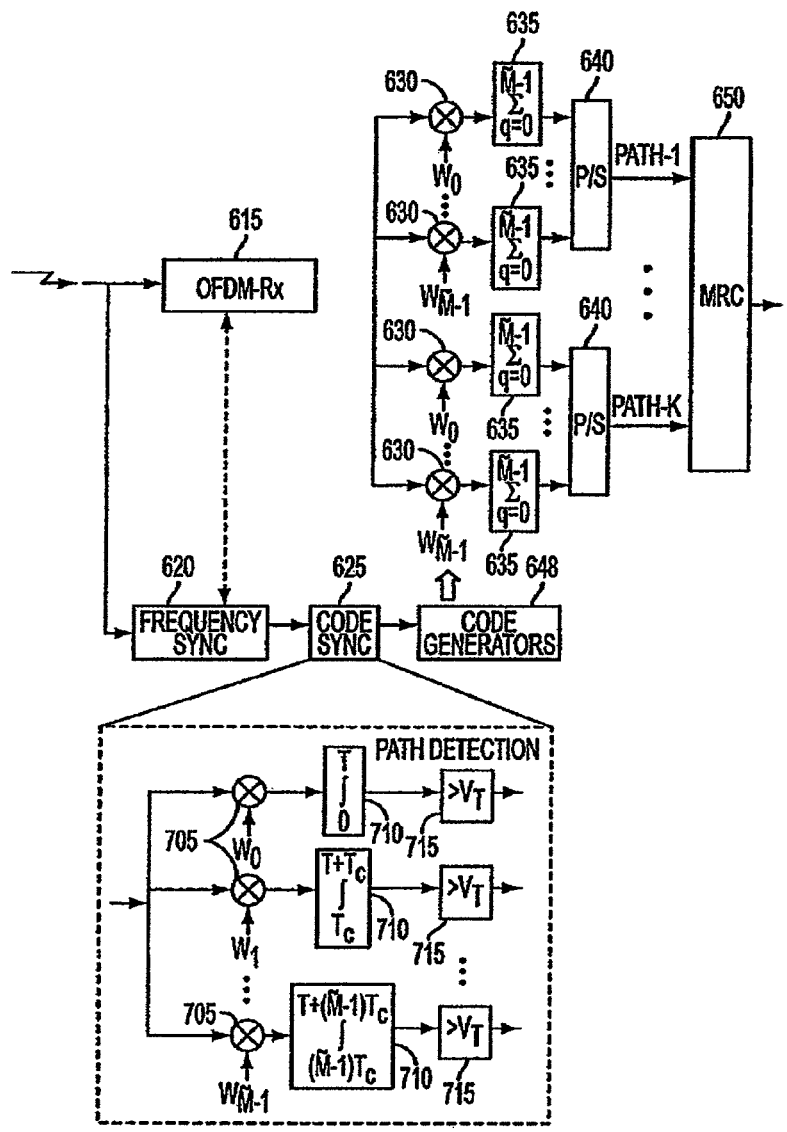
FIG. 7 shows IS-OFDM multi-path resolution.

In addition, the parallel orthogonal sequences can be used for multi-path resolution. That is, in a multi-path propagation environment, paths that are delayed by one or more chips (of length $T_c$) can be recovered. The process is illustrated in FIG. 7. The multi-path process is very similar to the process described in FIG. 6, which is the addition of frequency and time synchronization to the process described in FIG. 5. Since there are multiple paths, however, in FIG. 7 there is a plurality of P/S converters 640, which each accept a plurality of accumulated data streams. The P/S converters 640 each produce a P/S recovered data stream representing one of the multiple paths, where the K possible multiple paths are less than $\tilde{M}$. The P/S recovered data streams are accepted by a maximum ratio combiner 650 to produce a recovered data stream. The IS-OFDM code synchronization portion of the multi-path resolution process is performed by despreaders 705, which are coupled to time accumulators (integrators) 710. As shown, the set of $\tilde{N}$ orthogonal sequences ($w_0, w_1, \ldots, w_{\tilde{N}-1}$), are used to resolve up to $\tilde{N}$ paths. The incoming signal is frequency synchronized and DFT or FFT demodulated. Then it is despread (by despreaders 705) by code sequences $w_k$ (k=0, 1, 2, ..., $\tilde{N}$-1), in parallel, where each sequence k is delayed by $kT_c$. The time accumulation for the $k^{th}$ despreader takes place over the interval $kT_c \leq t \leq T+kT_c$, where $T=\tilde{N}T_c$. The time accumulated signals produced by the time accumulators are then each input to a threshold circuit 715. Since each received path contains all $\tilde{N}$ codes in synchronization, the above parallel code acquisition method can recover up to $\tilde{N}$ paths. The process described above is for a K-finger IS-OFDM rake receiver.

The IS-OFDM concept can be extended for cases where an incoming signaling point $x_q$ is assigned into only M out of $\tilde{N}$ frequency bins, M<$\tilde{N}$. In the examples below, the cases M=2<$\tilde{N}$ and M=$\tilde{N}$/2 are considered and illustrated by the matrices $D_2$ and $D_{\tilde{N}/2}$ respectively.

$$D_2 = \begin{bmatrix} x_0 & x_0 & \ldots & x_{\tilde{N}-2} & x_{\tilde{N}-2} \\ x_1 & x_1 & \ldots & x_{\tilde{N}-1} & x_{\tilde{N}-1} \end{bmatrix} \begin{matrix} \leftarrow w_0 \\ \leftarrow w_1 \end{matrix}$$
$$\uparrow \quad \uparrow \quad \quad \uparrow \quad \quad \uparrow$$
$$f_0 \quad f_1 \quad \quad f_{\tilde{N}-2} \quad f_{\tilde{N}-1}$$

$$D_2 = \begin{bmatrix} x_0 & \ldots & x_0 & x_{\frac{\tilde{N}}{2}} & \ldots & x_{\frac{\tilde{N}}{2}} \\ x_1 & \ldots & x_1 & x_{\frac{\tilde{N}}{2}+1} & \ldots & x_{\frac{\tilde{N}}{2}+1} \\ \ldots & \ldots & \ldots & \ldots & \ldots & \ldots \\ x_{\frac{\tilde{N}}{2}-1} & \ldots & x_{\frac{\tilde{N}}{2}-1} & x_{\tilde{N}-1} & \ldots & x_{\tilde{N}-1} \end{bmatrix} \begin{matrix} \leftarrow w_0 \\ \leftarrow w_1 \\ \\ \leftarrow w_{\frac{\tilde{N}}{2}-1} \end{matrix}$$
$$\uparrow \quad \quad \uparrow \quad \quad \uparrow \quad \quad \uparrow$$
$$f_0 \quad f_{\frac{\tilde{N}}{2}-1} \quad f_{\frac{\tilde{N}}{2}} \quad f_{\tilde{N}-1}$$

In the first case where M=2 the power of each data point is distributed into two frequency bins while in the second case where M=$\tilde{N}$/2 the power of each data point is distributed into half of the frequency bins. The frequency bins having the same data point may or may not be adjacent. This alternative of having M<$\tilde{N}$ reduces the peak-to-average amplitude of the signal as compared to the case where M=$\tilde{N}$, however the frequency diversity of the signal is also reduced into M out of $\tilde{N}$ sub-carriers.

Figure 8:
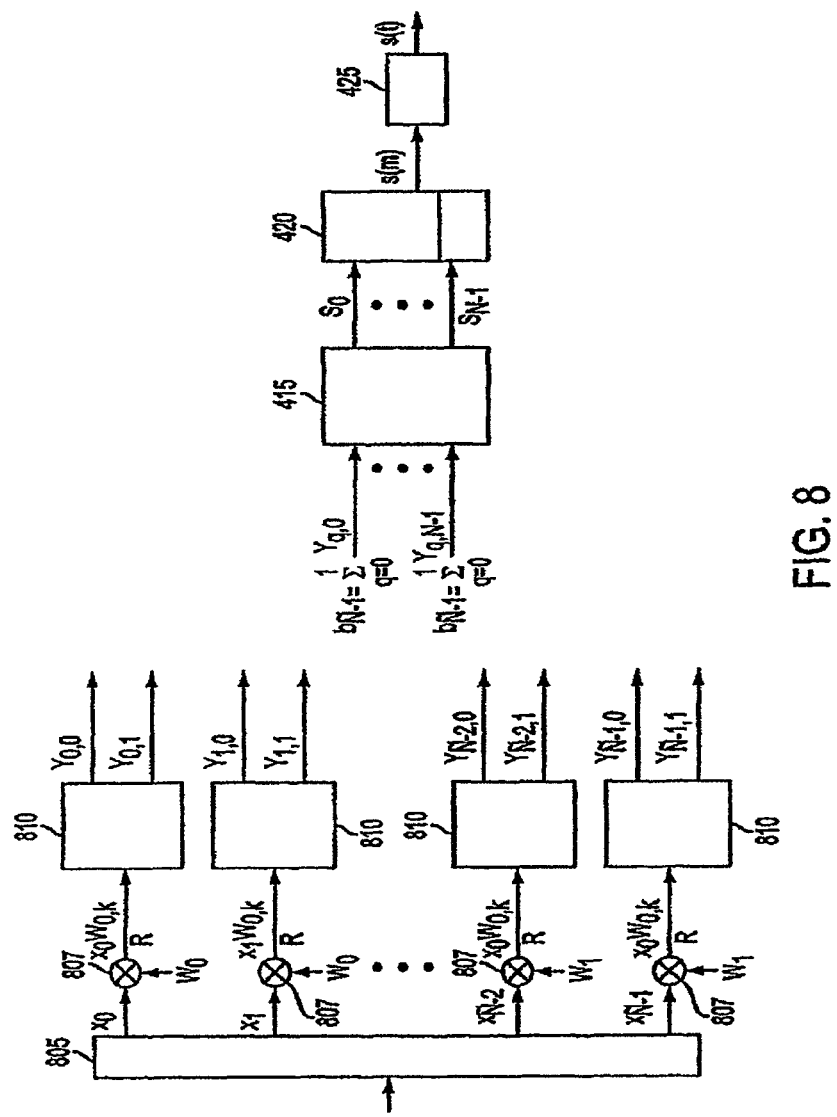
FIG. 8 depicts the IS-OFDM transmitter for $M=2<\tilde{N}$.
Figure 9:
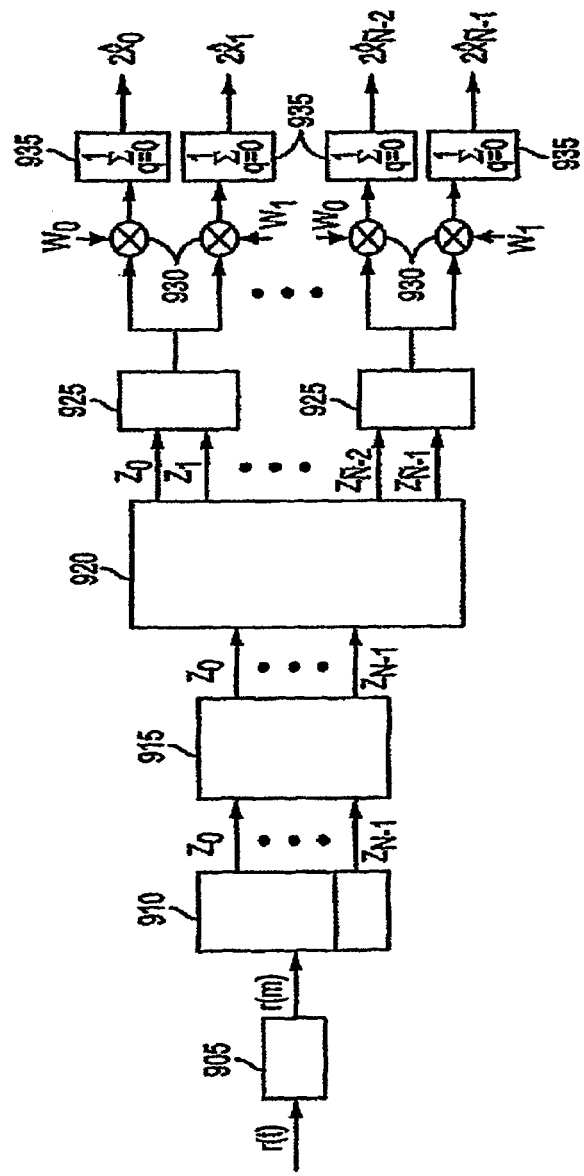
FIG. 9 shows the IS-OFDM receiver for $M=2<\tilde{N}$.

The IS-OFDM transmitter implementation for M=2<$\tilde{N}$ is illustrated in FIG. 8 and the corresponding receiver is illustrated in FIG. 9. S/P converter 805 is coupled to spreaders 807 with each spreader spreading only by code $w_0$ or $w_1$. Spreaders 807 are coupled to S/P buffers and encoders 810. If the outputs of the $\tilde{N}$ parallel S/P bit-buffers/encoders 810 are taken and summed to provide $\tilde{N}$ parallel data points $b_k$ shown in FIG. 8. Then, the N parallel points $b_k$ enter a single idft or ifft 415 followed by a P/S converter 420 (which adds guard-time or cyclic prefix to each frame). The signal s(m) is then input to an A/D converter 825. The transmitted signal s(m) for M<$\tilde{N}$ has the same expression as in equation (6) but with $b_k = \Sigma_{q=0}^{M-1} Y_{q,k}$.

The IS-OFDM receiver is illustrated in FIG. 9 and comprises A/D converter 905 coupled to S/P converter 910, which also removes the cyclic prefix. The outputs of the S/P converter 910 are input to DFT or FFT 915. The outputs of DFT or FFT 915 are input to decoder-demapper 920. The A/D converter 905, S/P converter 910, DFT or FFT 915 and decoder-demapper 920 can be considered an ordinary OFDM receiver. The received signal is then processed by an ordinary OFDM receiver the outputs of which are P/S converted by P/S converters 925 in groups of M and despread by despreaders 930 as shown in FIG. 9 for M=2. That is, two despreaders 930 operate on each output of each P/S converter 925. The despreader pair despreads the output of P/S converters 925 by using codes $w_0$ and $w_1$. The results of the despreaders are summed by accumulators 935.

A simulation model was used to perform a performance evaluation. Consider $b_{l,k}$ to be a symbol at the kth sub-carrier and the lth frame. Then, $b_k = \Sigma_{q=0}^{\tilde{N}-1} Y_{q,k}^{(l)}$, where $Y_{q,k}^{(l)}$ is the same as in equation (5). The mth idft or ifft output sample at the ith transmitted frame is then given by, $$s_l(m) = \frac{1}{\sqrt{N_s}} \sum_{k=0}^{N_s-1} b_{l,k} e^{j2\pi(km/N)} = \frac{1}{\sqrt{N_s}} \sum_{k=0}^{N_s-1} \sum_{q=0}^{N-1} Y_{q,k}^{(l)} e^{j2\pi(km/N)} \quad (12)$$

for m=-$N_g$, ..., N-1, There are $N_s$=N+$N_g$ samples per frame, $N_g$ are the guard-samples. The equivalent time length are $T_s$=T+$T_g$, $T_g$ is the guard time (or cyclic prefix), and the sampling time interval is $T_N$=T/N. The transmitted continuous time signal s(t) is given by.

$$s(t) = \frac{1}{\sqrt{T_s}} \sum_l \sum_k b_{l,k} e^{j2\pi k(t-T_g-lT_s/T)} g(t-lT_s) \quad (13)$$

$$\text{where, } g(t) = \begin{cases} 1 & \text{for } 0 \leq t < T_s \\ 0 & \text{elsewhere.} \end{cases}$$

First, the OFDM transmission subsystem was modeled. The wireless communication channel is considered to be a multi-path fading channel having an impulse response h(τ;t), $$h(\tau; t) = \sum_i h_i(t)\delta(\tau - \tau_i) \quad (14)$$

The simulation model was exercised assuming that the channel can be modeled as wide-sense stationary process with uncorrelated delays and further assuming that the delays $\tau_i$ are unchanged during the time of interest.

Considering the autocorrelation function of the channel (or multi-path intensity profile), $+[h(\tau_1;t)h^*(\tau_2;t+\Delta t)] = R_h(\tau_1;\Delta t)^*(\tau_1-\tau_2)$, the multi-path spread (or channel dispersion) $T_m$ then is the range of values or $\tau$ for which $R_h(\tau;\Delta t) > \gamma_\tau > 0$.

The Fourier transform of $R_h(\tau;\Delta t)$ is given by, $R_H(\Delta f;\Delta t) = \int_{-\infty}^{+\infty} R_h(\tau;\Delta t)e^{-j2\pi\tau\Delta f} d\tau$. The coherent bandwidth of the channel $(\Delta f)_c$ represents the range of values or $\Delta f$ for which $R_H(\Delta f) > \epsilon_f > 0$. Then $(\Delta f)_c \approx 1/T_m$.

For a given OFDM bandwidth B we distinguish the following two cases:

(a) If $(\Delta f)_c \ll B$ the channel is said to be frequency-selective.

(b) $(\Delta f)_c \gg B$ the channel is said to be frequency-nonselective.

In a pass-band transmission system, the transmitter time scale is unknown to the receiver. Hence, during the OFDM frame reception, the window setting for removal of the guard interval is usually offset by a time $\Delta t$. Similarly, the sampling time at the receiver $t'_s$ cannot be identical with the transmitter. This timing delay can be incorporated into a channel model represented by an equivalent impulse response $h'(\tau,t) = h(\tau, t-\Delta t)$ Therefore, due to the channel dispersion described above the received signal may contain disturbances caused by inter-symbol interference (ISI) and inter-(sub)channel interference (ICI). ISI and ICI may result from timing offset of the frame (or symbol) being greater than the guard interval $T_g$. ISI and ICI may also result from the channel impulse response being longer than the guard interval $T_g$.

Further considering the time variation of the channel as measured by the parameter $\Delta t$ in $R_H(\Delta f;\Delta t)$, the Fourier transform of $R_H(\Delta f;\Delta t)$ with respect to the variable $\Delta t$, $S_H(\Delta f;\lambda) = \int_{-\infty}^{+\infty} R_H(\Delta f;\Delta t)e^{-j\pi\lambda\Delta t}d\Delta t$ relates the Doppler effects to the time variation of the channel. If $\Delta f=0$ then, $S_H(\lambda) \equiv S_H(\Delta f;\lambda)$ is the power spectrum as a function of the Doppler frequency $\lambda$. The range of values of $\lambda$ for which $S_H(\lambda)$ is essentially nonzero is the Doppler-spread $B_d$ of the channel. The reciprocal of $B_d$ is a measure of the coherence time $(\Delta t)_c$ of the channel. i.e., $(\Delta t)_c \approx 1/B_d$.

For a given OFDM frame or symbol length T, we distinguish the following two cases:

(c) If $(\Delta t)_c \lesssim T$ the channel is said to be time-selective.

(d) $(\Delta t)_c \gg T$ the channel is said to be time-nonselective.

The total OFDM interference in a time-selective channel (i.e. $(\Delta t)_c \leq T$) is dominated by the ICI while in a time-nonselective channel ICI and ISI equally contribute to the interference because ISI is independent of the coherence time.

In this case, consider a narrow-band interferer within the transmission bandwidth. Assuming, however, that the timing offset is smaller than the guard interval so that no ISI or ICS occurs and further assuming that the channel multi-path fading is frequency-flat, i.e., $Bw > (\Delta f)_c$. The received signal is then given by, $$r(t) = \sum_i h_i(t)s(t - \tau_i) + I(t) + n(t) \quad (15)$$

where, $I(t)$ represents an interfering signal from narrow-band transmission and $n(k)$ is additive white Gaussian noise.

A/D converting and sampling the signal (by A/D converter 505) at time instants $t_n = nT_N$ $$r(n) = \sum_{l=-\infty}^{+\infty} \sum_{m=-N_g}^{N-1} h_i(n)s(n-m) + I(n) + n(n) \quad (16)$$

is obtained. After S/P converting and removing the guard interval (by S/P converter 510), the N samples received during the lth frame (or OFDM symbol) are represented by the vector $$r_l = [r_{l,n}] = [r_{l,0}, r_{l,1}, \ldots, r_{l,N-1}] \quad (17)$$

where, $r_{l,n} = r((n+N_g+lN_S)T)$.

The signal $r_{l,n}$ will then be demodulated by the DFT or FFT 515. Assuming for the moment, that the channel remains unchanged for the duration of the OFDM frame, the output of the DFT or FFT 515 at the lth frame (or OFDM symbol) and kth sub-carrier is given by, $$Z'_{l,k} = b_{l,k} \cdot H_{l,k} + I_{l,k} + \eta_{l,k} \text{ where, } Z'_{l,k} = \sum_{n=1}^{N-1} r_{l,n} e^{-j2\pi k(n/N)} \quad (18)$$

where, $b_{l,k}$ is defined in (5). $H_{l,k}$ is the channel transfer function (CTF) during the lth frame and at subcarrier frequency $f_k = k/T$, which may be considered to include both the response of the channel and the transmission filter. $H_{l,k}$ is given by, $$H_{l,k} = \sum_i h_i(l)e^{-j2\pi k(\tau_i/T)} \quad (19)$$

Also, $I_{k,l}$ is the DFT or FFT of $I(k)$ and $\eta_{k,l}$ is the DFT or FFT of $n_{k,l}$.

The signal $Z'_{l,k}$ is further processed by the decoder-demapper 520, which provides the signal $$Z_{l,k} = a_{l,k} \cdot H_{l,k} + I_{l,k} + \eta_{l,k} \text{ where, } a_{l,k} = 2\sum_{q=0}^{\tilde{N}-1} x_q^{(l)} w_{q,k} \quad (20)$$

for $k=0, 1, \ldots \tilde{N}-1$. This signal then enters a parallel-to-serial (P/S) converter 525, the output of which will be despread (by despreaders 530) by each orthogonal sequence in parallel for recovering the corresponding signaling point, and summed by accumulators 535 as shown in FIG. 5. Now, since the channel is a stationary process, attention may be focused on a particular frame and the subscript/may be dropped. The output of the despreader-1 is then given by, $$\mathcal{Z}_l = \sum_{k=0}^{\tilde{N}-1} Z_k w_{1,k} = \sum_{k=0}^{\tilde{N}-1} a_k H_k w_{1,k} + \sum_{k=0}^{\tilde{N}-1} I_k w_{1,k} + \sum_{k=0}^{\tilde{N}-1} \eta_k w_{1,k} \quad (21)$$

Based on the assumption of frequency-flat fading, $H_k$ has the same value for all sub-channels k. Hence, $H_k$=H for k=1, 2, . . . , Ñ−1. The useful signal (represented by the first term above) provides the signaling data point $x_1$ as shown below, $$\sum_{k=0}^{\tilde{N}-1} a_k H_k w_{1,k} = H \sum_{k=0}^{\tilde{N}-1} \left[ 2 \sum_{q=0}^{\tilde{N}-1} x_q w_{q,k} \right] w_{1,k} = \quad (22)$$

$$H \sum_{q=0}^{\tilde{N}-1} x_q \left[ 2 \sum_{q=0}^{\tilde{N}-1} x_{q,k} w_{1,k} \right] = \begin{cases} H(2\tilde{N}x_1) & \text{for } q=1 \\ 0 & \text{for } q \neq 1 \end{cases}$$

Notice that in the above derivation $x_q$ has the same value in all sub-carriers k=0, 1, . . . , Ñ−1. Hence, $$\mathcal{Z}_l = H(\tilde{N}x_1) + \sum_{k=0}^{\tilde{N}-1} I_k w_{1,k} + \sum_{k=0}^{\tilde{N}-1} \eta_k w_{1,k} \quad (23)$$

The total power at the output of the each despreader then is, $P_Z=P_u+P_I+P_0$. Where $P_u$ is the useful signal power and is given by, $P_u=N^2 x_1^2$, (N=2Ñ). $P_I$ is the interference power and is represented as follows: $P_I$=Var$\{|\Sigma_k I_k w_{l,k}|\}$=E$\{\Sigma_k(|I_k w_{l,k}|^2)\}$. Assuming that random variables $I_k$ are independent of the sub-carrier k, (as well as random variables $w_{l,k}$), then $P_I$ is given by, $P_I=\Sigma_{k=1}^L E[|I_k|^2]$. Also, $P_\eta$ is the noise power, which is given by, $P_\eta=N\sigma_\eta^2$, where $\sigma_\eta^2=E(\eta_k^2)$ for all k. The signal-to-interference and noise ratio (SINR) then is given by, $$SINR = \frac{\bar{P}_u}{P_I \mp P_\eta} = \frac{N^2 x_1^2}{\sum_{k=1}^{L} E[|I_k|^2] + N\sigma_\eta^2} \quad (24)$$

From the above equation it can be observed that the useful signal power $x_1^2$ is received from all Ñ frequency bins while the interference power only exists in L out of N frequency bins (L<N). This is the advantage of IS-OFDM as compared with an ordinary OFDM in which the data symbols in the frequency bins affected by the narrow-band interference may not be recovered. In the IS-OFDM on the other hand, the SINR is averaged over all frequency bins since each data symbol spreads its power to all bins.

Now considering the effects of Inter-Symbol and Inter-Channel Interfences (ISI and ICI). ICI and ISI occurs when the channel dispersion time $T_m$ (due to multi-path), is greater than the guard interval $T_g$. That is, $T_m \geq T_g$, and since $T_g = N_g T_N$, $T_m - N_g T_N \gtrless 0$. Then, the sampling offset Δn is, $[T_m/T_N] - N_g \geq \Delta n \geq 0$. On the other hand if, $T_m \leq T_g$ or $T_m - N_g T_N \gtrless 0$, no ICI or ISI will occur and any sampling offset Δn≤0 can preserve the orthogonality between consecutive symbols.

In order to demonstrate this effect first consider a single path with frame misalignment or receiver synchronization offset Δn. The received signal samples may then be expressed by, $$r_{1,n} = \sum_i h_i(t) s(n' T_N - \tau_i) + \eta(n' T_N) \quad (25)$$

where, $T_N$ is the sampling interval ($T_N$=T/N), n'=n+Δn+ $N_g$+l$N_S$ and the sampling offset Δn≥0. Replacing the transmitted signal s(t) in the above equation yields, $$r_{1,n} = \quad (26)$$
$$\sum_i h_i(t) \left[ \sum_l \sum_k a_{l,k} e^{j2\pi k[(n' T_N - T_g - lT_S - \tau_i)/T]} g(n' T_N - lT_S - \tau_i) \right] + $$
$$n(n' T_N)$$

Now since Δn>0 the vector $r_1$ will contain samples from both the lth symbol the (l+1)st symbol, which will cause ICI and ISI. That is, $$r_l = [r_{l,\Delta n}, r_{l,\Delta n+1}, \ldots, r_{l,N-1-\Delta n+1}, r_{l+1,0}, r_{l+1,1}, \ldots, r_{l+1,\Delta n-1}] \quad (27)$$

Demodulating this vector by DFT or FFT, the output signal $z_{l,k}$ of a single path is given by, $$z_{l,k} = u_{l,k} + (ici)_{l,k} + (isi)_{l,k} + \eta_{l,k} \quad (28)$$

where, $u_{l,k}$ is the useful part of the signal, $(ici)_{l,k}$ and $(isi)_{l,k}$ are the inter-channel and inter-symbol interferences respectively and n $\eta_{l,k}$ is the DFT or FFT of the white Gaussian noise. Each component is given below $$u_{l,k} = \frac{N - \Delta n}{\tilde{N}} b_{l,k} e^{j2\pi \Delta n(k/N)} \quad (29)$$

$$(ici)_{l,k} = \frac{1}{N} \sum_{n=0}^{N-1-\Delta n} \sum_{i=1, i \neq k}^{N} a_{l,i} e^{j2\pi[n(i-k)+i\Delta n/N]} \quad (30)$$

$$(isi)_{l,k} = \frac{1}{N} \sum_{n=N-\Delta n}^{N-1} \sum_{i=1}^{N} a_{l+1,i} e^{j2\pi[n(i-k)+i(N-\Delta n)/N]} \quad (31)$$

Assuming now that the above offset is a result of the multi-path channel having a transfer function $H_{l,k}$ for each path and further assuming that the channel remains constant for the duration of one frame or OFDM symbol, the signal at the output of the DFT or FFT and after the decoder-demapper is given by, $$Z_{l,k} = \tilde{H}_{l,k} a_{l,k} e^{j2\pi \Delta n(k/N)} + (ICI)_{l,k} + (ISI)_{l,k} + \eta_{l,k} \quad (32)$$

where, $\tilde{H}_{l,k} = \alpha(\Delta n_i) H_{l,k}$ and $\alpha(\Delta n_i)$ is the resulting attenuation of the symbols which is approximated by, $(\Delta n_i) = \Sigma_i |h_i(t)|^2 [(N-\Delta n_i)/N]$.

It has been shown, that at the DFT or FFT output, and for any given frame or OFDM symbol l, the total power of the signal $P_S(k)$ (without the noise) is the sum of the useful power $P_U$ and the powers of the interchannel and intersymbol interferences $P_{ICI}(k)$ and $P_{ISI}(k)$ respectively, i.e., $P_U(k) + P_{ICI}(k) + P_{ISI}(k) = P_S(k)$. This means that, depending on the channel conditions the relative values of each of the three components of $P_S(k)$ may vary but their sum is always constant.

As is observed in equation (32), the useful component of the signal is attenuated and rotated by a phasor with phase proportional to the sub-carrier index k and the timing offset Δn, but they are constant in time. Since the phase rotation is constant in time it will have no impact on the system if coherent or differential modulation has been used having a channel estimator. Then each of the N outputs of the DFT or FFT may scaled and rotated, by a channel estimator and are given by, $$Z_k = \hat{H}_k a_k + I_k + \eta_k \quad (33)$$

In the above equation the subscript l has been dropped. $\hat{H}_k$ is the estimate of sub-channel k. Also, $I_l$ represents the total inter-channel and inter-symbol interference before the despreader.

Now, since $a_k = 2\Sigma_{q=0}^{\tilde{N}-1} x_q^{(l)} w_{q,k}$ the useful data component $U_l$ at the output of the despreader-1 is given by, $$U_1 = \sum_{k=0}^{\tilde{N}} \hat{H}_k a_k w_{1,k} = N\hat{H}x_1 \quad (34)$$

The above equation has the same derivation as equation (22). Here again the assumption of frequency-nonselective (frequency-flat) channel has been used, that is, $\hat{H}_k \approx \hat{H}$ for all k. The normalized useful signal power (with respect to $\hat{H}$), then is $\bar{P}_u = P_u = |\hat{H}|^2 = N^2 x_1^2$. The interference noise at the output of the despreader is given by, $\bar{I} = \Sigma_{k=0}^{\tilde{N}-1} I_k w_{l,k}$.

As is known, $I_k$ may be approximate to Gaussian noise with variance $\mathrm{Var}(I_k) = \sigma_k^2$. Hence, $\mathrm{Var}(\bar{I}) = \Sigma_{k=0}^{\tilde{N}-1} w_{l,k}^2 \mathrm{Var}(I_k) = \Sigma_{k=0}^{\tilde{N}-1} 2\sigma_k$.

In the above equation the assumption that the interference $I_k$ is independently distributed for each k has been made. The interference power at the output of the despreader then is $P_I = 2\Sigma_{k=0}^{\tilde{N}-1} 2\sigma_k^2$ and the signal to interference and noise ratio (SINR) is given by $$SINR = \frac{\bar{P}_u}{P_I \mp P_\eta} = \frac{N^2 x_1^2}{2\sum_{k=0}^{\tilde{N}-1} \sigma_k^2 + N\sigma_\eta^2} \quad (35)$$

Assuming that the interference $I_k$ is also identically distributed with variance $\sigma_1^2 = \sigma_k^2$ for all k, then, $SINR = Nx_1^2/(\sigma_1^2 + \sigma_\eta^2)$.

As has been described above, a channel is said to be frequency-selective if its coherence bandwidth is much smaller than its transmission bandwidth, i.e., $(\Delta f)_c \ll B$. Here, in addition it can be assumed that the channel is time-flat (or time-nonselective) which means that the coherence time is much greater than the frame length, i.e., $(\Delta t)_c \gg T$.

In this case, the useful part of the signal at the output of the despreader-1 is given by $$U_1 = \sum_{k=0}^{\tilde{N}-1} a_k H_k w_{1,k} \quad (36)$$

$$= \sum_{k=0}^{\tilde{N}-1} H_k \left[ \sum_{q=0}^{\tilde{N}-1} x_q w_{q,k} \right] w_{1,k}$$

$$= \sum_{q=0}^{\tilde{N}-1} x_q \sum_{k=0}^{\tilde{N}-1} H_k w_{q,k} w_{1,k}$$

$$= x_1 \sum_{k=0}^{\tilde{N}-1} H_k + n_u$$

The noise $n_u$ that is introduced in this case, is due to the loss of orthogonality because the transfer function $H_k$ does not have a constant value for all k. Using the property that each row of a Hadamard matrix in normal form (except the first one) has $\tilde{N}/2$ -1s and $\tilde{N}/2$ +1s, $n_u$ is given by, $n_u = \Sigma_{q=1}^{\tilde{N}-1} x_q [\Sigma_{m=1}^{\tilde{N}/2-1} H_m - \Sigma_{m=\tilde{N}/2}^{\tilde{N}-1} H_m]$.

For a deeply frequency-selective fading channel this noise component may be significant. In such a case it is necessary to obtain an estimate $\hat{H}$ of the transfer function of each sub-channel k (before the despreading operation), in order to compensate (equalize) for the frequency-selective fading and to eliminate the "noise" $n_u$. The signal before the despreading will then be given by $Z_k = \hat{H} a_k + I_k + \eta_k$.

The noise power $P_I$ (due to ISI and ICI, $\bar{I} = \Sigma_{k=0}^{\tilde{N}-1} I_k w_{1,k}$), at the output of the despreader then is $P_I = 2\Sigma_{k=0}^{\tilde{N}-1} \sigma_k^2$. In frequency-selective fading however, $\sigma_k^2$ varies from one frequency bin k to another. Therefore, the despreader/accumulator can maximize the signal to interference and noise ratio (SINR) by averaging over all frequency bins. Thus, the output of the despreader-1 is, $$SINR = \frac{P_u}{E\{|n_u|^2\} + 2\sum_{k=0}^{\tilde{N}-1} \sigma_k^2 + N\sigma_\eta^2} \approx \frac{N^2 x_1^2 |\hat{H}|^2}{2\sum_{k=0}^{\tilde{N}-1} \sigma_k^2 + N\sigma_\eta^2} \quad (37)$$

Therefore, given that the "noise" $n_u$, can be eliminated, the IS-OFDM has an advantage over the ordinary OFDM in which frequency-selective fading may result in lost of symbols in the frequency bins where the deep fades occur.

An OFDM channel is said to be time-selective if its coherence time is smaller than the frame or symbol length T i.e., $(\Delta t)_c < T_s$. In addition, here it is assumed that the channel is frequency-flat (or frequency-nonselective), which means that the coherence bandwidth is greater than the transmission bandwidth, i.e., $(\Delta f)_c > B$.

Assuming that the channel impulse response is given by $h(t,\tau) = \Sigma_i \gamma_i(t) \delta(t-\tau_i)$, the received OFDM signal in time-varying channels is given by, $$r(t) = \sum_i \gamma_i(t) s(t - \tau_i) \quad (38)$$

where $\tau_i$ is the delay of the ith path and $\gamma_i(t)$ is its corresponding complex amplitude. $\gamma(t)$ is assumed to be a wide-sense stationary (wss) process with zero mean, unit variance and auto-correlation function $R_\gamma(\tau) = \epsilon[\gamma(t+\tau)\gamma^*(t)]$.

The transmitted time domain signal can be represented as follows, $$s(t) = \sum_k s_k e^{j2\pi f_k t} \text{ for } 0 < t \leq T_S \qquad (39)$$

where, $f_k = f_0 + k\Delta f$ is the frequency of the kth subcarrier and $\Delta f = 1/T_s$. The received signal after the DFT or FFT demodulation then is, $$Z'_m = \frac{1}{T_S} \int_0^{T_S} r(t) e^{-j2\pi f_m t} dt \qquad (40)$$

For simplicity, as is known integration has been used instead of DFT or FFT.

Replacing r(t) and s(t) from the corresponding equations above yields, $$Z'_m = \sum_k \left\{ \frac{1}{T_s} \int_0^{T_S} r(t) e^{-j2\pi (f_m - f_k) r} dt \right\} s_k = H_0 s_m + \sum_{k \neq m} H_{k-m} s_k \qquad (41)$$

where, $H_l$ is defined by, $$H_l = \frac{1}{T_s} \int_0^{T_S} \gamma(t) e^{-j2\pi l \Delta f t} dt \qquad (42)$$

$H_0$ represents the attenuation and phase shift of the desired signal and $H_k$'s for $k \neq 0$ the inter-channel interference (ICI), which is dominant in time varying channels. The above implies that any time variation in the channel results in $H_k \neq 0$, for k>0.

The signal at the output of the decoder-demapper then becomes, $$Z_m = H_0 a_m + \sum_{k \neq m} H_{k-m} a_k \text{ where, } a_m = 2 \sum_{q=0}^{\tilde{N}-1} x_q w_{q,m} \qquad (43)$$

After that, the signals $Z_m$ are converted into serial format and then despread in parallel by orthogonal sequences. The output of the despreader-1 is then given by, $$\dot{z}_1 = \sum_{m=0}^{\tilde{N}-1} Z_m w_{1,m} = \sum_{m=0}^{\tilde{N}-1} a_m H_0 w_{1,m} + \sum_{m=0}^{\tilde{N}-1} I_m w_{1,m} \qquad (44)$$

where, $I_m = \sum_{k \neq m} H_{m-k} a_k$ is the ICI.

The first term of the above equation is the useful part of the signal. Since $H_0$ is constant in the frequency domain (frequency-flat channel), the signal recovered at the output of the despreader-1 is given below, $$\sum_{k=0}^{\tilde{N}-1} a_k H_0 w_{1,k} = H_0(2\tilde{N} x_1) \text{ where, } H_0 = \frac{1}{T_S} \int_0^{T_S} \gamma(t) dt \qquad (45)$$

The useful power then is, $P_U = N^2 H_0^2 x_1^2$, ($N = 2\tilde{N}$). The interference power $P_1 = \text{Var}\{|\Sigma_m I_m w_{l,m}|\} = E\{\Sigma_m (|I_m w_{l,m}|^2)\}$, assuming that random variables $I_m$ are independent, $P_I$ is given by, $$P_I = \sum_m E[|I_m|^2] = \sum_m \sigma_m^2 \qquad (46)$$

As is known, $\sigma_m^2 = E[|I_m|^2]$ is tightly bounded by, $$\sigma_m^2 \leq \frac{d_1}{12}(2\pi f_d T_s)^2 \text{ where, } d_1 = \frac{2}{f_d^2} \int_0^{f_d} f^2 S_H(f) df \qquad (47)$$

$S_H(f)$ is the Fourier transform of the autocorrelation function of $\gamma_t(t)$, i.e., $S_H(f) = F\{R_\gamma(\tau)\}$, and describes the Doppler power spectrum. According to Jakes' model $S_H(f)$ is given by, $$S_H(f) = \frac{1}{\pi f_d \sqrt{1 - (f/f_d)^2}} \text{ for } |f| \leq f_d \qquad (48)$$

where, $f_d$ is the Doppler frequency. The signal-to-interference ratio then is $$SIR = \frac{P_u}{P_I} = \frac{N^2 H_0^2 x_1^2}{\sum_{m=0}^{\tilde{N}-1} \sigma_m^2} \qquad (49)$$

The above equation indicates that the SIR of the IS-OFDM in time-varying channel will be better than the ordinary OFDM if the variance $\sigma_m^2$ varies from one frequency bin m to another. If not, the IS and the ordinary OFDM have the same SIR performance.

The uncoded bit error probability due to narrow-band interference and Average White Gaussian Noise (AWGN) has been evaluated by computer simulation and comparisons between the ordinary OFDM and the IS-OFDM wireless systems.

The system parameters considered are as follows: The signal bandwidth is 20 MHz and $\tilde{N} = 64$. The frequency sub-carriers are spaced 312 kHz apart and the data modulation is Quad Phase Shift Keying (QPSK) for all sub-carriers. The narrow-band interference is modeled as a Gaussian process with constant one-sided spectral density $\sigma_{NBI}$ and a total bandwidth $W_{NBI} = 10$ MHz. The process is the output of a 20 tap linear band-pass FIR filter, characterized by a stop-band value of −30 dB, driven at the input by a Gaussian sequence. The uncoded bit error probability has been evaluated for the power of interference to signal ratio values JSR=−10, −8, . . . , 8, 10 dBs. JSR is defined as the ratio JSR=$P_I/P_S$, where $P_I$ is the average interference power and $P_S$ is the average transmitted signal power.

Figure 11:
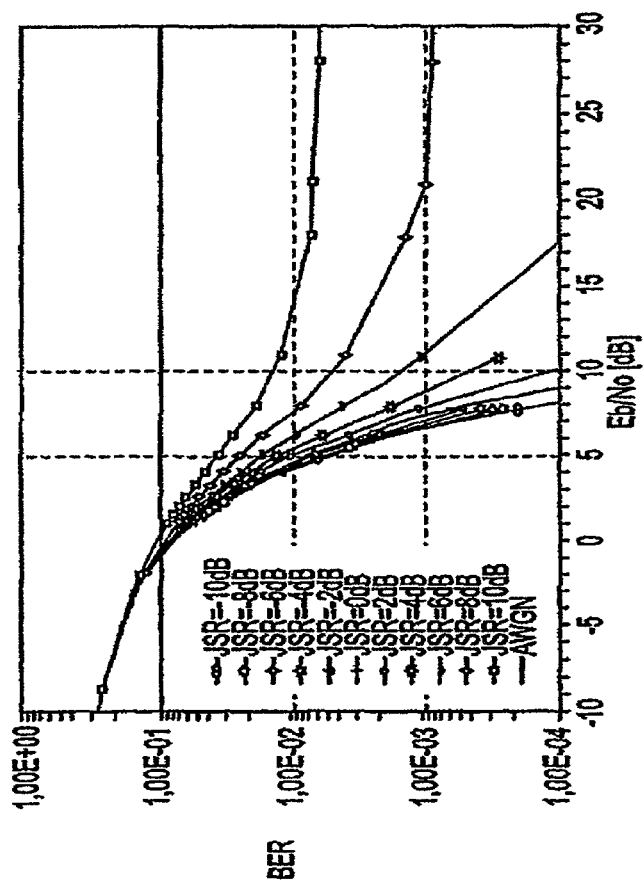
FIG. 11 shows the average bit error probability (BER) of the IS-OFDM system versus the $E_b/N_0$ [dB] and the narrow-band interference power to signal ratio JSR, as a parameter.

FIGS. 11 and 12 show the performance results for the ordinary OFDM and IS-OFDM systems respectively. The ordinary OFDM has been generated from the IS-OFDM by taking an identity matrix instead of a Hadamard one, so that the two systems are equivalent.

Figure 10:
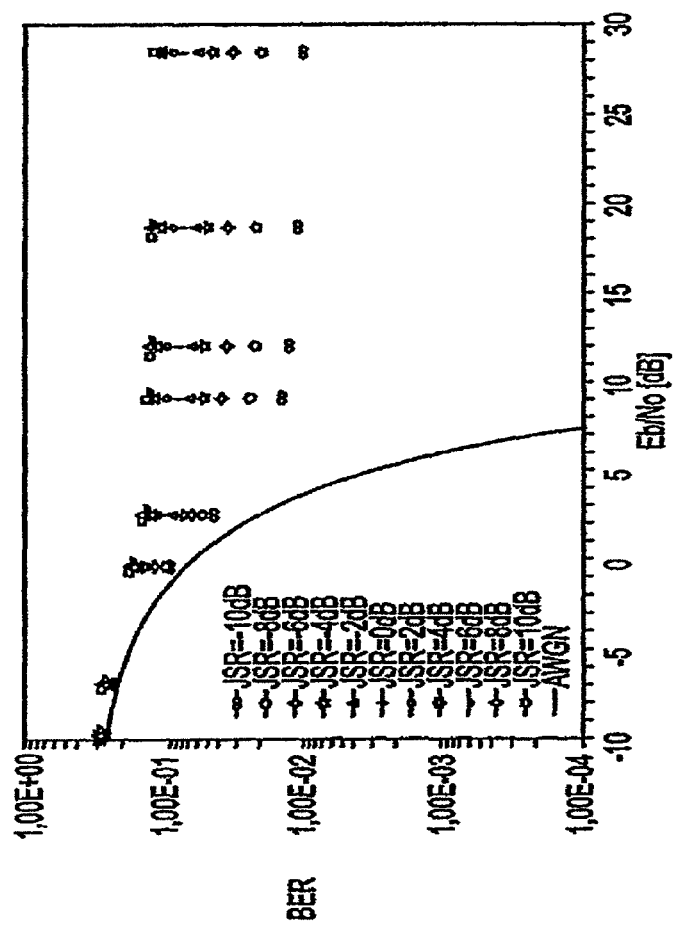
FIG. 10 shows the average bit error probability (BER) of the ordinary OFDM system versus the $E_b/N_0$ [dB] ($N_0$ is the power spectral density of the AWGN) and the JSR as a parameter.

FIG. 10 shows the average bit error probability (BER) of the ordinary OFDM system versus the $E_b/N_0$ [dB] ($N_0$ is the power spectral density of the AWGN) and the JSR as a parameter with the values considered above. The performance curve for the AWGN channel is taken as a benchmark. A significant floor for BER is observed when $E_b/N_0 > 10$ dB. For a target BER equal to $2 \times 10^{-2}$, a shifting of 5 dB is visible also for low values of JSR, e.g., JSR=−10 dB. The penalty grows dramatically for any higher value of interference power, becoming intolerable. In such a case, an Forward Error Correcting (FEC) coding of the system would not significantly improve the system performance.

FIG. 11 shows the average bit error probability (BER) of the IS-OFDM system versus the $E_b/N_0$ [dB] and the narrow-band interference power to signal ratio JSR, as a parameter. Performance results highlight that degradation induced by narrow-band interference is constrained within 2 dB, for JSR≤0 dB and for BER=$10^{-3}$ instead of ∞ as in the former case. The BER can be less than $2 \times 10^{-2}$, even if JSR=10 dB.

The major finding showed by Monte Carlo simulations is that improvement in bit error probability due to a form of diversity introduced by the IS-OFDM system does not simply follow a proportional relation. In fact, the gain can become infinity if the target BER is fixed under the error floor induced by narrow-band interference.

Based on the performance evaluation and analysis presented above, the proposed IS-OFDM system can be characterized by the following features:

1. The IS-OFDM provides a point-to-point wireless link without spreading the incoming data rate.
2. The IS-OFDM, as with the ordinary OFDM, is appropriate for transmission of high data rates while maintaining symbol duration longer than the channel's dispersion time.
3. The IS-OFDM provides narrow-band interference suppression. That is, if one or more frequency bins are affected by interference, symbols may still be recovered from the remaining bins since each IS-OFDM symbol is transmitted in all (or at least in two) bins.
4. In frequency-selective fading the IS-OFDM requires that the transfer function of each frequency bin is equalized to a constant value so that the orthogonality between Hadamard sequences is maintained. If this problem is solved, IS-OFDM offers the advantage of averaging the power of each transmitted symbol over all frequency bins (for which that symbol is transmitted) some of which may be faded.
5. In time-selective fading the IS-OFDM does not have any additional advantage, but it has all the properties of an ordinary OFDM system.
6. The ordinary OFDM is a special case of the IS-OFDM in which the Hadamard sequences (used for separating different symbols is the same frequency bin), are replaced by non-Hadamard (0,1)-orthogonal sequences.
7. The IS-OFDM system design is flexible in terms of distributing the transmit symbol power into two, three, or all frequency bins. When the transmit symbol power is distributed into a smaller number of frequency bins the peak-to-average amplitude is reduced, however the frequency diversity is also reduced.
8. The IS-OFDM system allows resolution of multi-paths. Such a mechanism, utilizes the $\tilde{N}$ parallel Hadamard sequences for resolving up to $\tilde{N}$ paths, which are received one or more chips apart.
9. Finally, the IS-OFDM may be conceived or modeled as a multi-carrier orthogonal code division multiplexed (M-OCDM) system utilizing complex orthogonal sequences.

In conclusion, the IS-OFDM is an innovative method for providing high bit rate in wireless transmission links, which is reliable and spectrally efficient. IS-OFDM has all the advantages of the ordinary OFDM and additionally new ones which are the result of distributing the transmit power of each symbol into more than one frequency bins.

It should be clear from the foregoing that the objectives of the invention have been met. While particular embodiments of the present invention have been described and illustrated, it should be noted that the invention is not limited thereto since modifications may be made by persons skilled in the art. The present application contemplates any and all modifications within the spirit and scope of the underlying invention disclosed and claimed herein.

What is claimed is:

1. An interference suppression orthogonal frequency division multiplexed system, comprising:
    an interference suppression orthogonal frequency division multiplexed receiver, wherein the interference suppression orthogonal frequency division multiplexed receiver comprises:
        a serial-to-parallel converter for processing a received signal to produce a plurality of parallel data streams;
        a transform module for applying a transform function to the plurality of parallel data streams to produce a plurality of parallel complex data streams;
        a decoder mapper module for applying a demapping function to the plurality of parallel complex data streams to produce a plurality of parallel demapped data streams;
        a parallel-to-serial converter for processing the plurality of parallel demapped data streams to produce a serial data stream;
        a plurality of despreaders, each despreader of the plurality of despreaders coupled to the parallel-to-serial converter, each despreader of the plurality of despreaders operates by applying a code sequence to the serial data stream resulting in a set of parallel despread data streams;
        a plurality of accumulators for summing the set of parallel despread data streams to produce a plurality of accumulated data streams;
        a parallel-to-serial converter for processing the plurality of accumulated data streams to produce a recovered data stream; and
        wherein each one of the set of parallel despread data streams comprises a plurality of sub-carriers, wherein each one of the plurality of sub-carriers contains data bits of the recovered data stream, the data bits separated from each other by the code sequence where a power of each one of the data bits is spread to all of the plurality of sub-carriers, wherein each sub-carrier of the plurality of sub-carriers contains more than one symbol transmitted in a given frame.

2. The interference suppression orthogonal frequency division multiplexed system of claim 1, wherein the code sequence comprises an orthogonal binary code sequence.

3. The interference suppression orthogonal frequency division multiplexed system of claim 1, wherein the code sequence comprises a hadamard code sequence.

4. The interference suppression orthogonal frequency division multiplexed system of claim 1, wherein the transform function comprises a fourier transform function.

5. The interference suppression orthogonal frequency division multiplexed system of claim 1, wherein the transform function comprises a fast fourier transform function.

6. The interference suppression orthogonal frequency division multiplexed system of claim 1, further comprising:
an analog to digital converter for applying a conversion to a demodulated signal to produce the received signal.

7. An interference suppression orthogonal frequency division multiplexed receiver, comprising:
a serial-to-parallel converter for processing a received signal to produce a plurality of parallel data streams;
a transform module for applying a transform function to the plurality of parallel data streams to produce a plurality of parallel complex data streams;
a decoder mapper module for applying a demapping function to the plurality of parallel complex data streams to produce a plurality of parallel demapped data streams;
a parallel-to-serial converter for processing the plurality of parallel demapped data stream to produce a serial data stream;
a plurality of despreaders, each despreader of the plurality of despreaders coupled to the parallel-to-serial converter, each despreader of the plurality of despreaders operates by applying a code sequence to the serial data stream resulting in a set of parallel despread data streams;
a plurality of accumulators for summing the set of parallel despread data streams to produce a plurality of accumulated data streams;
a parallel-to-serial converter for processing the plurality of accumulated data streams to produce a recovered data stream; and
wherein each one of the set of parallel despread data streams comprises a plurality of sub-carriers, wherein each one of the plurality of sub-carriers contains data bits of the recovered data stream separated from each other by the code sequence where a power of each one of the data bits is spread to all of the plurality of sub-carriers, wherein each sub-carrier of the plurality of sub-carriers contains more than one symbol transmitted in a given frame.

8. The interference suppression orthogonal frequency division multiplexed receiver of claim 7, wherein the code sequence comprises an orthogonal binary code sequence.

9. The interference suppression orthogonal frequency division multiplexed receiver of claim 7, wherein the code sequence comprises a hadamard code sequence.

10. The interference suppression orthogonal frequency division multiplexed receiver of claim 7, wherein the transform function comprises a fourier transform function.

11. The interference suppression orthogonal frequency division multiplexed receiver of claim 7, wherein the transform function comprises a fast fourier transform function.

12. The interference suppression orthogonal frequency division multiplexed receiver of claim 7, further comprising:
an analog to digital converter for applying a conversion to a demodulated signal to produce the received signal.

13. A method for producing a recovered data stream, comprising:
processing, by a receiver, a received signal to produce a plurality of parallel data streams;
applying, by the receiver, a transform function to the plurality of parallel data streams to produce a plurality of parallel complex data streams;
applying, by the receiver, a demapping function to the plurality of parallel complex data streams to produce a plurality of parallel demapped data streams;
processing, by the receiver, the plurality of parallel demapped data stream to produce a serial data stream;
applying, by the receiver, a code sequence to the serial data stream resulting in a set of parallel despread data streams;
summing, by the receiver, the set of parallel despread data streams to produce a plurality of accumulated data streams;
processing, by the receiver, the plurality of accumulated data streams to produce the recovered data stream; and
wherein each one of the set of parallel despread data streams comprises a plurality of sub-carriers, wherein each one of the plurality of sub-carriers contains data bits of the recovered data stream separated from each other by the code sequence where a power of each one of the data bits is spread to all of the plurality of sub-carriers, wherein each sub-carrier of the plurality of sub-carriers contains more than one symbol transmitted in a given frame.

14. The method of claim 13, wherein the code sequence comprises an orthogonal binary code sequence.

* * * * *